(12) United States Patent
Demski et al.

(10) Patent No.: US 11,364,838 B2
(45) Date of Patent: Jun. 21, 2022

(54) METHOD OF CONTROLLING AN AGRICULTURAL VEHICLE LIGHTING SYSTEM AND SYSTEM THEREOF

(71) Applicant: DEERE & COMPANY, Moline, IL (US)

(72) Inventors: Nathan R. Demski, Durango, IA (US); Brian M. Huenink, Cedar Grove, WI (US); Eric A. Keen, Manhattan, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/193,755

(22) Filed: Mar. 5, 2021

(65) Prior Publication Data

US 2021/0402916 A1  Dec. 30, 2021

Related U.S. Application Data

(60) Provisional application No. 63/045,971, filed on Jun. 30, 2020.

(51) Int. Cl.
*H05B 45/10* (2020.01)
*H05B 45/20* (2020.01)
*B60Q 1/14* (2006.01)

(52) U.S. Cl.
CPC ........... *B60Q 1/1423* (2013.01); *H05B 45/10* (2020.01); *H05B 45/20* (2020.01); *B60Q 2400/20* (2013.01); *B60Y 2200/222* (2013.01)

(58) Field of Classification Search
None
See application file for complete search history.

(56) References Cited

U.S. PATENT DOCUMENTS 10,195,980 B2  2/2019  Widdowson et al.
10,538,195 B2  1/2020  Fritz et al.
(Continued)

FOREIGN PATENT DOCUMENTS

DE          19839881 A1    3/2000
DE        102010038841 A1  2/2012
(Continued)

OTHER PUBLICATIONS

Demski et al., Implement Recognition Lighting, U.S. Appl. No. 63/017,978, filed Apr. 30, 2020, 88 pages.
(Continued)

*Primary Examiner* — Dedei K Hammond
(74) *Attorney, Agent, or Firm* — Taft Stettinius & Hollister LLP; Stephen F. Rost (57) ABSTRACT

An agricultural work vehicle for operating in a field includes a chassis, a cab mounted to the chassis, a controller for controlling operation of the work vehicle, and a lighting system including a array field light. The controller is in communication with a field map input, and the array field light projects a light emission to illuminate a zone. A light control module is disposed in electrical communication with the controller and operably controls the array field light. Upon identifying an object in the field based on the field map input, the controller determines if the object is in the zone. If the object is in the zone, the light control module controllably adjusts an output from the array field light based on a location of the object in the zone.

18 Claims, 4 Drawing Sheets

(56) References Cited

U.S. PATENT DOCUMENTS

| | | | |
|---|---|---|---|
| 10,829,033 B1* | 11/2020 | McKinney | A01D 41/14 |
| 2018/0279539 A1 | 10/2018 | Wagner | |
| 2021/0197709 A1* | 7/2021 | Sung | G06K 9/3233 |

FOREIGN PATENT DOCUMENTS

| | | |
|---|---|---|
| DE | 102015104928 A1 | 10/2016 |
| DE | 102017205467 A1 | 8/2018 |
| DE | 102019110098 A1 | 1/2020 |
| EP | 2158799 A1 | 3/2010 |
| WO | WO2019036674 A1 | 2/2019 |

OTHER PUBLICATIONS

Schott et al., Method for Communication between Two Utility Vehicles, unpublished U.S. Appl. No. 17/155,722, filed Jan. 22, 2021, 11 pages.

German Search Report issued in application No. DE102021204141.8, dated Dec. 6, 2021, 6 pages.

* cited by examiner

Fig. 4

METHOD OF CONTROLLING AN AGRICULTURAL VEHICLE LIGHTING SYSTEM AND SYSTEM THEREOF

RELATED APPLICATIONS

This application claims the benefit of U.S. Provisional Patent Application Ser. No. 63/045,971, filed Jun. 30, 2020, the disclosure of which is hereby incorporated by reference in its entirety.

FIELD OF THE DISCLOSURE

The present disclosure relates to a lighting system of a work vehicle, and in particular, to a method of controlling the lighting system of the work vehicle.

BACKGROUND

Lighting systems on vehicles are well known and perform numerous tasks. In some instances, conventional lighting systems for on-road vehicles may adjust lighting levels on the basis of other vehicles positioned along a similar path. These lighting systems can offer guidance to an operator who is controlling the steering and operation of the vehicle.

In some ways, these conventional lighting systems are being used in off-road vehicles such as agricultural machines, construction or industrial machines, and forestry machines. As technology continues to evolve and is added to these types of machines, additional in-cabin lights and controls are added for operation by the operator. These additional lights and controls can cause an operator to focus more attention on these controls rather than in a field, on an implement, or areas around the machine. The continuous back-and-forth between monitoring the controls and lights within the cab of the machine and the field being operated in can cause fatigue to the operator and possible errors in the field operation.

While operating a vehicle, particularly an off-road vehicle, when it is difficult to see such as at night or when it is foggy, it is often difficult to identify objects in a line of travel. A conventional lighting system of a vehicle can often illuminate the surrounding area of the vehicle, but it is otherwise limited in assisting with identifying objects or property lines in a field.

It is therefore desirable to provide a lighting system of a work vehicle that may be controlled automatically or manually to detect or otherwise identify objects during operation and adjust the lighting system accordingly.

SUMMARY

In one embodiment of the present disclosure, an agricultural work vehicle for operating in a field includes a chassis; a cab mounted to the chassis; a controller for controlling operation of the work vehicle, the controller being in communication with a field map input; a lighting system of the work vehicle comprising a array field light, the array field light configured to project a light emission to illuminate a zone; a light control module disposed in electrical communication with the controller, the light control module configured to operably control the at least one array field light; wherein, upon identifying an object in the field based on the field map input, the controller determines if the object is in the zone; further wherein, if the object is in the zone, the light control module controllably adjusts an output from the array field light based on a location of the object in the zone.

A control system of an agricultural work vehicle configured to work in a field includes a controller for controlling the work vehicle; a light control module for controlling a lighting system of the work vehicle, the lighting system including at least a first array field light and a second array field light; and a sensing device comprising a camera or sensor for detecting a presence of an object in the field, the sensing device being in electrical communication with the controller; wherein, the first array field light is operably controllable to project a light emission to illuminate a first zone in the area and the second array field light is operably controllable to project a light emission to illuminate a second zone in the area, the first zone and second zone being different from one another; wherein, upon detecting the object in the area, the sensing device transmits a signal indicative of the object to the controller; wherein, the controller determines if the detected object is in the first zone or the second zone; further wherein, if the object is in the first zone, the light control module controllably adjusts an output from the first array field light based on a location of the object in the first zone; and if the object is in the second zone, the light control module controllably adjusts an output from the second array field light based on a location of the object in the second zone.

A control system of an off-road work vehicle configured to work in a field includes a controller for controlling the work vehicle; a light control module for controlling a lighting system of the work vehicle, the lighting system including a array field light; and a field map input in communication with the controller, the field map input configured to communicate a boundary line of the field to the controller; wherein, the array field light is operably controllable to project a light emission to illuminate a zone in the field; wherein, upon receiving the boundary line from the field map input, the controller determines if the zone overlaps the boundary line; further wherein, if a portion of the zone overlaps the boundary line, the light control module controllably adjusts an output from the array field light to disable the light emission from illuminating the portion of the zone.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
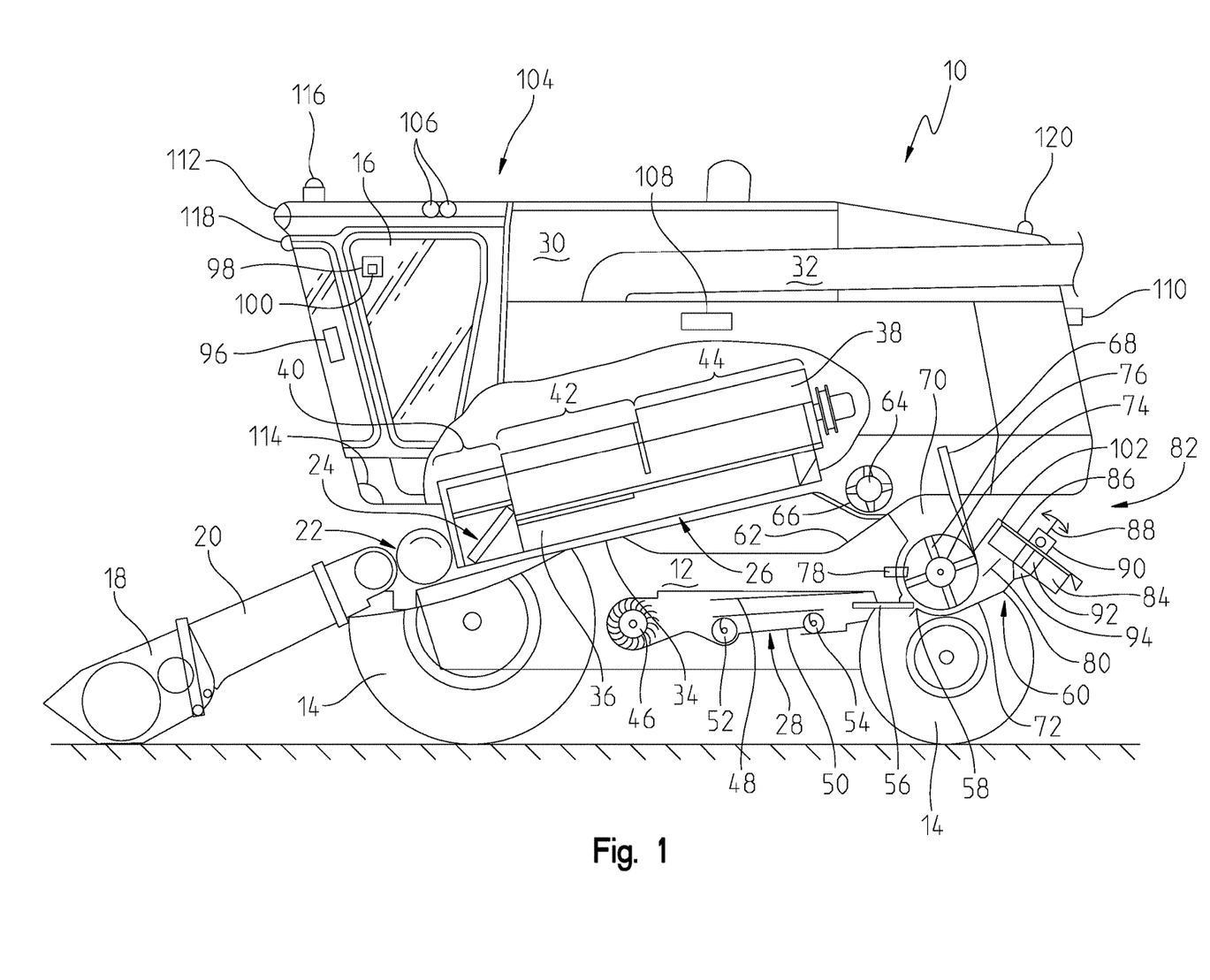
FIG. 1 is a partial section of a side view of an agricultural vehicle with a lighting system according to the present disclosure.

In FIG. 1, an illustrative example is provided of a work machine. In this example, the work machine is depicted as an agricultural vehicle, and in particular, to an agricultural combine 10. The present disclosure, however, is not limited to a combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the embodiment of FIG. 1, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls including an operator terminal or controls 96 for controlling the operation of the combine 10. A cutter head 18 may form part of an implement attached to the combine 10. Alternatively, the cutter head 18 may form part of the combine and thus is mounted to the chassis 12. In any event, the cutter head 18 may be disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In FIG. 1, the agricultural vehicle 10 may include a lighting module or system 104 which is an integral part of the vehicle. The lighting module or system 104 may utilize a high-definition (HD) pixel or pixel light-emitting diode (LED) light array module. The system 104 may include its own control module 224 (see FIG. 2). The light system control module or controller 224 may be operably disposed in electrical communication with a vehicle controller 222, which controls the operation of the vehicle 10. The vehicle controller 222 may send communications or signals to the control module 224 for controlling the lighting system 104.

With matrix lighting, a vehicle controller may use a high beam and a low beam to illuminate the vehicle surroundings. With matrix lighting control, the controller may turn off the high beam and create a darkened column in the area where an oncoming vehicle or object is so as to not blind the vehicle (or person). With HD LED or HD Pixel source LED illumination, pixel technology is utilized in which more focused areas can be illuminated or de-illuminated based on need. Rather than using a single bulb, for example, the lighting system of the present disclosure may control individual pixels or pixel segments to project or illuminate. Individual segments may include between a thousand to over a million pixels, and the lighting system controller or control module 224 may operably enable or disable individual segments during operation. Moreover, the control module 224 may vary the intensity of the individual segments to project information or other communications onto the field.

The lighting system may be formed by an ambient or working lighting of the vehicle or an illumination provided inside the cab 16 in the form of illuminatable control and display elements or interior lighting. The working lighting may include a plurality of field lights mounted to the vehicle at different locations. In one example, each of the plurality of field lights may comprise a LED array field light. Other technology besides LED may be used for the field lights. The plurality of field lights may include a first field light 106, a second field light 108, a third field light 110, a fourth field light 112, and a fifth field light 114. In other embodiments, there may be additional or fewer field lights. In other words, there can be any number of field lights mounted to the chassis 12, cab 16, cutter head 18, etc. In the illustrated example of FIG. 1, the first field light 106 may be mounted to a roof of the cab 16. The second field light 108 may be mounted to each side or only one side of the vehicle 10. The third field light 110 may be mounted to the rear of the chassis 12. The fourth field light 112 may be mounted to a front portion of the roof of the cab 16, and the fifth field light 114 may be mounted to a front deflector or portion of the chassis 12 below the cab 16. The location of each field light may differ on other vehicles or machines, and thus the example of FIG. 1 is only intended to illustrate an example of one lighting system 104.

The plurality of field lights may enable an aerial or overlapping illumination of a terrain or field surface surrounding the agricultural vehicle 10. One or more of the field lights can be activated individually and varied in terms of their luminous intensity by the vehicle controller 222 for adapting the emission characteristic or light intensity.

In addition to the actual lamp (Halogen or gas discharge lamp, LEDs or the like), one or more of the plurality of field lights may have optical devices for changing the emission characteristic, and consequently, the emission angle or the emission angle-dependent light distribution. The optical devices can be formed either by electrically controllable optical systems (collimators or lens systems), or else by the lamp itself. In the latter case, this may include a segmented LED matrix, in which individual matrix segments can be switched on and off and varied in their luminosity by the controller 222.

Inside the cab 16 may include a camera 100 for optically detecting the position or head posture of a vehicle operator. The information obtained by the camera 100 may be fed to the controller 222 to determine the instantaneous viewing direction of the vehicle operator using image processing software. The camera 100 may be integrated in a rear-view mirror or a housing 98, for example, covered by the rear-view mirror.

Figure 2:
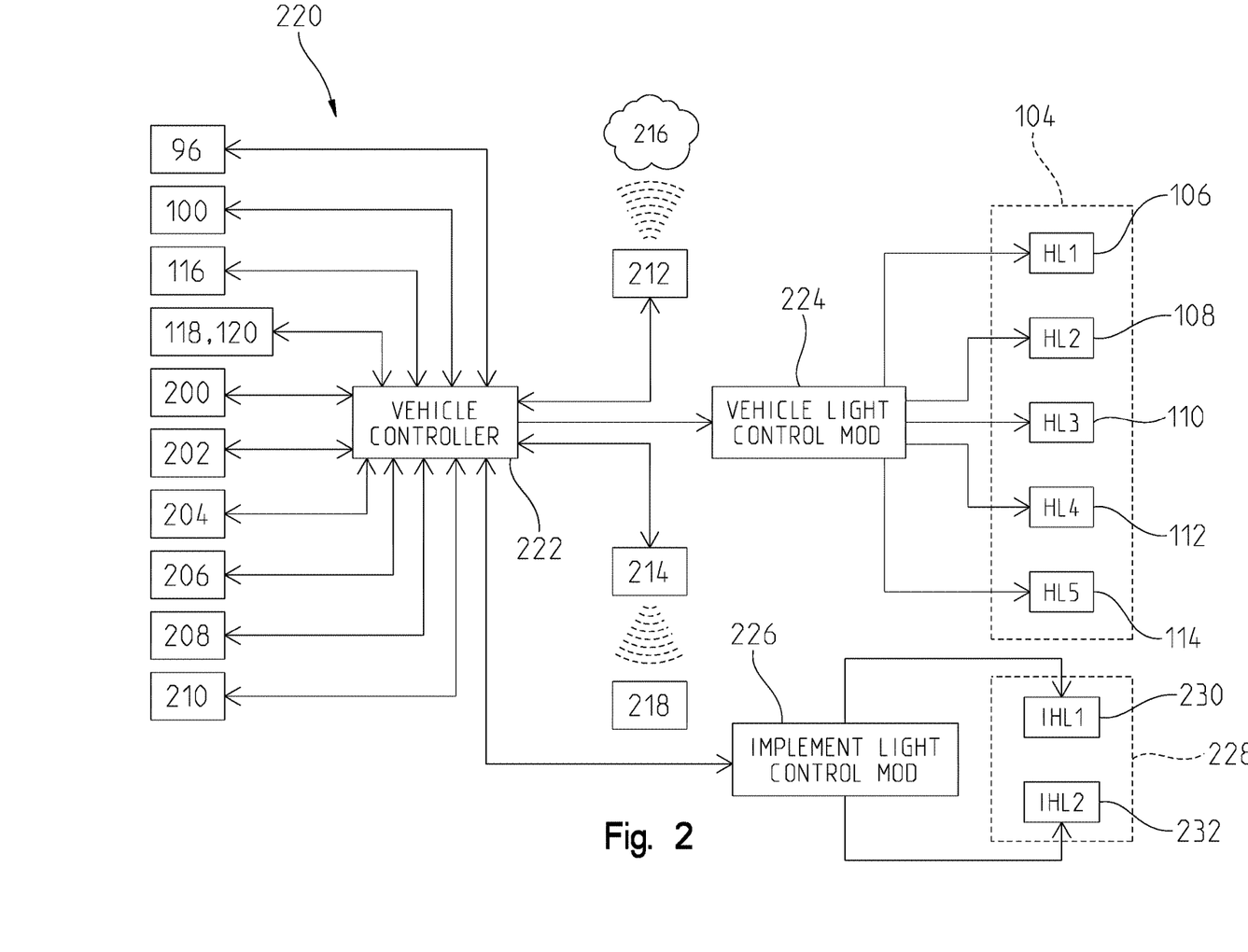
FIG. 2 is a schematic of a control system of the vehicle and lighting system of FIG. 1.

As shown in FIG. 2, the vehicle controller 222 may form part of a vehicle control system 220. Here, the controller 222 may include a data interface 212 for the wireless reception of position or other information broadcast by another work machine or vehicle (not shown). The position information broadcast by the other vehicle may be located in a data cloud 216 and can be retrieved from there via the data interface 212 using an existing wireless network.

On the basis of the position information received, the controller 222 can determine a relative position of the agricultural vehicle 10 with respect to another vehicle or an implement, for which purpose the controller 222 performs a comparison with position information in relation to the vehicle 10. The assessment or determination of the relative position may be carried out on the basis of a polar coordinate system, in which the vehicle 10 forms the origin of the coordinate system.

The position information related to the vehicle 10 may be captured by a satellite-based navigation system. The satellite-based navigation system can be either installed in the vehicle 10 or else implemented as a wireless device 218. The latter may be a component part of a mobile telephone of the vehicle operator, wherein the calculated position information is transmitted wirelessly to the controller 222 via an LTE connection established by a wireless interface 214.

In addition, in order to determine potential extraneous light effects, the controller 222 may be connected to an ambient-sensing light or image sensor. The light or image sensor may be a panorama or 360-degree camera 116 arranged in the roof area of the cab 16. Alternatively, it can also be light-sensitive sensor elements or individual cameras (not shown), distributed along an outer side of the vehicle 10.

Besides the lighting system 104 and cameras, the agricultural vehicle 10 may include one or more sensors for detecting a relative position of the vehicle to another object. For example, a first proximity sensor 118 may be mounted to the front side of the vehicle 10 and a second proximity sensor 120 may be mounted to the rear side thereof. Each sensor may be in electrical communication with the controller 222, as shown in FIG. 2. The first sensor 118 may detect an object in front of the vehicle as it travels in a forward direction, whereas the second sensor 120 may detect an object either approaching from behind or an object in the path of rearward movement of the vehicle 10. The vehicle 10 may include additional sensors for detecting the position of the vehicle relative to surrounding objects and provide corresponding feedback to the controller 222.

The controller 222 may be in a position where it receives data and other feedback from the operator of the vehicle along with sensors, cameras, remote devices, and the like across the vehicle and implement. In the example of FIG. 2, the controller 222 may be arranged to receive a plurality of inputs. For instance, the controller may receive communication from the operator terminal 96 in the form of commands or instructions from the operator. This may include instructions to accelerate, decelerate, or turn the tractor. Alternatively, this may include to active or de-activate the lighting system 104. Further, it may include commands to operate the vehicle according to a desired mode or setting. Other known operator commands may be communicated to the controller 222 via the operator terminal 96.

The controller 222 may also receive images or other communications from the camera 100 located in the cab 16 of the vehicle. The camera may detect movement of the operator and communicate the same to the controller 222. While a camera is depicted in FIG. 1, the camera 100 may also comprise a sensor for detecting a characteristic of the vehicle from inside the cab 16.

The controller 222 may further receive communication from the camera 116 located externally of the cab 16. Here, the camera 116 may detect environmental conditions such as dusk or dawn, lighting effects from the lighting system 104, along with a view of the area around the work vehicle 10. This may include objects or obstacles in a field, a fence line, a roadway, or other on-road or off-road vehicles in the general area. Further, the camera 116 may detect an implement being towed by the work machine and communicating this to the controller 222. In one example, the camera 116 may provide images to the controller 222, which in turn may communicate these images to the operator as will be described further below.

The controller 222 may be in communication with the first and second proximity sensors 118, 120. The sensors may communicate objects that are within a predefined distance of the vehicle 10. This may include other vehicles or an implement being towed by the work vehicle in the field, or on a roadway during transport.

As shown in FIG. 2, the controller 222 may receive communications from one or more sensors 200 regarding an operating status, operating position, or diagnostic trouble codes (DTCs) related to the vehicle. These sensors 200 may communicate warnings in the form of DTCs to the operator such as, but not limited to, low battery level, low fuel, etc.

The controller 222 may receive communications from a field map input 202 which may include positional information relative to a field. This information may be determined and loaded into a memory unit of the controller 222, or it may be communicated from a remote source. The information from the field map input 202 may include field boundaries, roadways, fence lines, obstacles to avoid, etc. This information may be provided to the controller 222, which can then provide this information to the operator during field operation.

The controller 222 may also be in communication with a global positioning sensor (GPS) input 204. The GPS input 204 may come from a satellite or other remote sensing device (e.g., a cell phone). The GPS input 204 may provide a location of the vehicle 10 to the operator so that the operator is able to determine where in the field the vehicle is located.

A vehicle speed input 206 may provide vehicle speed to the controller 222. An operation mode type input 208 may provide the operator with details related to what type of operating mode a towed implement or the cutter head 18 is in. For an agricultural sprayer, for example, the operation mode type input 208 may signal when a sprayer boom of the sprayer is folded, which is indicative of a transport mode, or unfolded, which is indicative of a field or working mode.

Other sensors 210 may be in communication with the controller 222 to provide performance data or information about the vehicle or implement. This performance data or information may include any data that is generally collected, monitored, displayed, calculated, etc. and provided to the operator to better control the operation of the vehicle or implement.

As shown in FIG. 2, the work vehicle 10 may be capable of towing an implement. For instance, the work vehicle may be a tractor which tows a mowing, planting or spraying implement. In any event, the implement may include its own lighting system. The implement lighting system may be operably controlled by the vehicle controller 222 in the same way as the vehicle lighting system 104. In another embodiment, the implement lighting system may be operably controlled via the vehicle light control module 224.

In yet another embodiment, which is shown in FIG. 2, the implement lighting system may include its own implement light control module 226 for operably controlling the implement lighting system. Here, the implement lighting system 228 may include a first implement array field light 230 and a second LED array implement field light 232. The implement lighting system 228 may include one or more array field lights for projecting a light emission externally from the implement to illuminate areas around the implement.

As described above, conventional lighting systems were controlled to either be turned completely on or off. If a high beam and low beam were available, then a high beam may be used to further illuminate the surrounding environment compared to the low beam. When an oncoming vehicle is detected, the high beam may be switched to the low beam. In doing so, the operator of the oncoming vehicle is not blinded by the light emission of the high beam.

In this disclosure, the light control module 224 of the vehicle and/or the implement light control module 226 may receive communications from the controller 222 and operably control individual pixel segments to project or display light emissions from each of its individual array field lights. Each array field light may be operably controlled independently of the other field lights such that at any given time one or more of the LED field lights may be operably controlled on or off. As a result, if an object or boundary is detected, individual pixel segments may be disabled without completing shutting off the entire field light. This can provide advantages such that the surrounding environment may still be illuminated by the lighting system, but the intensity of individual pixels or pixel segments may be adjusted based on what is detected by the control system. The ability to control the lighting system of the vehicle and implement via matrix lighting technology, along with camera and/or sensor technology to detect the presence of an oncoming vehicle and the like, provides additional benefits over conventional lighting systems.

To achieve the aforementioned benefits, the present disclosure provides a high-definition pixel and/or pixel LED lighting system to expand the overall coverage zone of illumination around the work vehicle and implement. This lighting system may improve the visibility of the work vehicle and implement to the operator and to others in or near the coverage zone, particularly as more work vehicles are operating later at night. The lighting system may be operably controlled via control system to that shown in FIG. 2 where individual array field lights may be selectively controlled to modify the light emission therefrom.

In one example of this disclosure, a fast strobe sequence of all array field lights may be implemented to help illuminate the work vehicle so that another vehicle in the field or otherwise may clearly see the work vehicle. The fast strobe sequence may utilize a rotation of a field light, flashing, or any other type of lighting sequence.

In a further example, a lighting system of a work vehicle may be interfaced with a lighting system on a towed implement. For instance, a tractor may be pulling a planter through a field such that the tractor lighting system and planter lighting system project light emissions from each array field light to illuminate the field in which they are operating. In this example, the vehicle controller may operably control the planter lighting system to illuminate the field and then operably control the tractor lighting system to illuminate those zones or areas not illuminated by the planter lighting system. The use of matrix lighting may be implemented where individual pixel segments of each array field light may be controlled on to fill in the gaps left by the planter lighting system. The same may be true with using the planter lighting system to fill in gaps not illuminated by the tractor lighting system.

Figure 3:
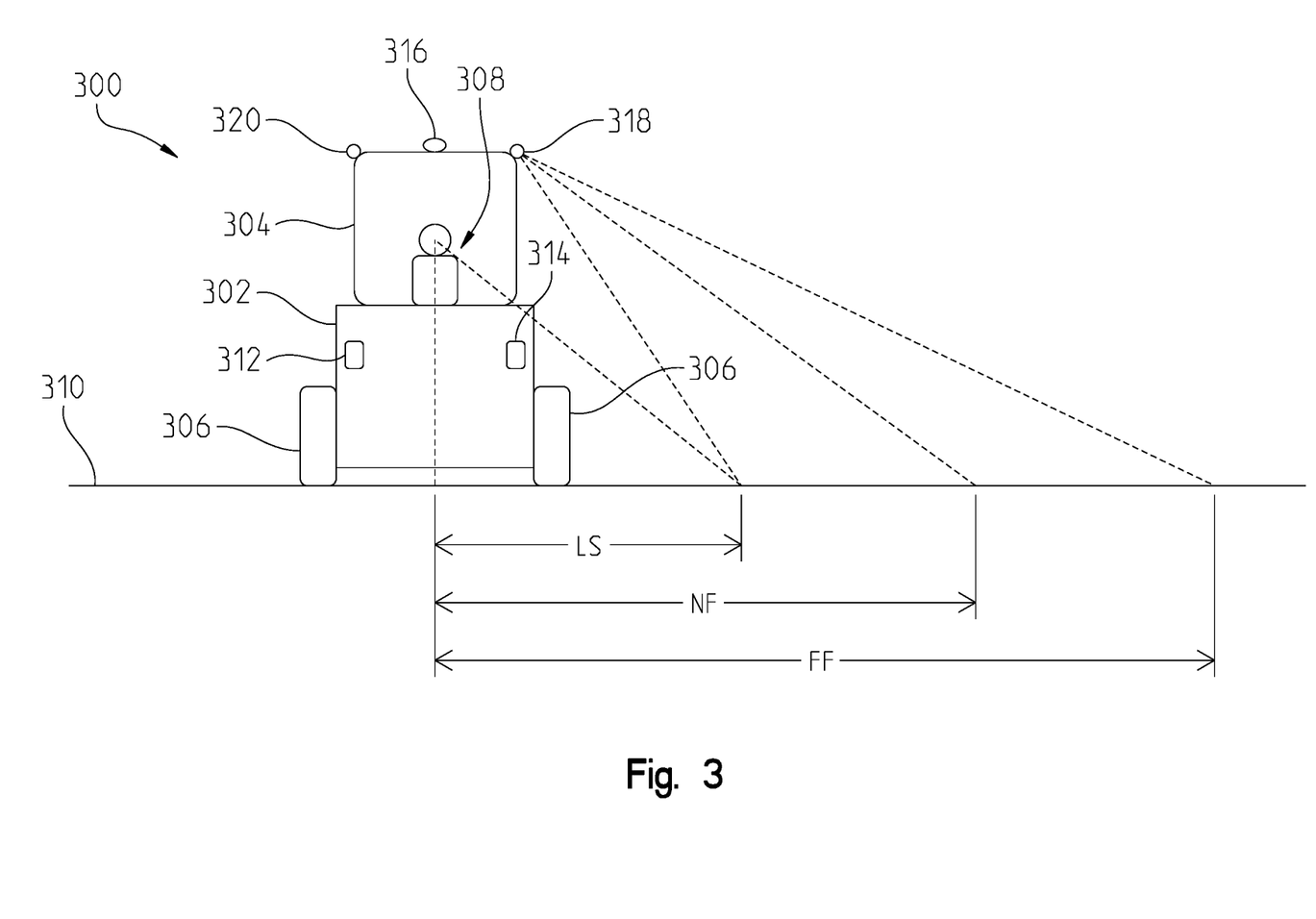
FIG. 3 is a schematic of a work vehicle with a lighting system.

Referring to FIG. 3, a work vehicle in the form of a tractor 300 is shown. While a tractor 300 is depicted, the work vehicle may include any work vehicle in the agricultural, construction, or forestry industries. Further, work vehicles outside of these industries may also be applicable for the sake of this disclosure. The tractor 300 may include a chassis 302 or frame to which a cab 304 is mounted. An operator 308 may be positioned within the cab 304 for controlling the operation of the tractor 300 via one or more controls (not shown). The chassis 302 may be supported on a ground (e.g., a field or roadway) via a plurality of wheels 306.

In this embodiment, the tractor 300 may include a lighting system similar to that described above with reference to FIGS. 1 and 2. In particular, the lighting system may be a high-definition pixel and/or pixel LED lighting system. The lighting system, for example, may include a plurality of array field lights. In FIG. 3, the plurality of array field lights may include a first array field light 312, a second array field light 314, a third array field light 316, a fourth array field light 318, and a fifth array field light 320. The first and second array field lights 312, 314 may be positioned on a front end of the tractor 300, whereas the other array field lights may be positioned at different locations on the cab 304. Additional array field lights may also form part of the lighting system such as including one or more array field lights positioned on a rear end of the tractor 300. The plurality of array field lights are configured to illuminate the entire surrounding area or environment of the tractor 300 to allow the operator 308 to better visualize the field 310 and any objects therein.

As shown in FIG. 3, the operator 308 may be capable of visualizing the field at a distance, LS, from a position within the cab. In one example, this may be approximately a 2-5 meter radius around the tractor 300. The lighting system may be able to illuminate a near field defined by radius, NF, to allow the operator to better see up to a 5-15 meter radius. Further, the lighting system may further be able to illuminate a far field area defined by radius, FF, in FIG. 3. This may allow an operator to see between a 30-50 meter radius from the cab 304. As will be described, if the control system 220 determines that a field boundary or object is present in the far field area, the control system 220 may be able to operably control the lighting system to shut off the illumination of the far field zone, FF, and only illuminate the areas or zones designated by LS and NF. In doing so, one or more pixels or pixel segments of the fourth array field light 318 in FIG. 3 may be disabled so that the far field zone is not illuminated at least on this side of the tractor 300. By only controlling the fourth array field light 318, however, the other array field lights may continue to illuminate the far field zones without impacting the oncoming vehicle.

Figure 4:
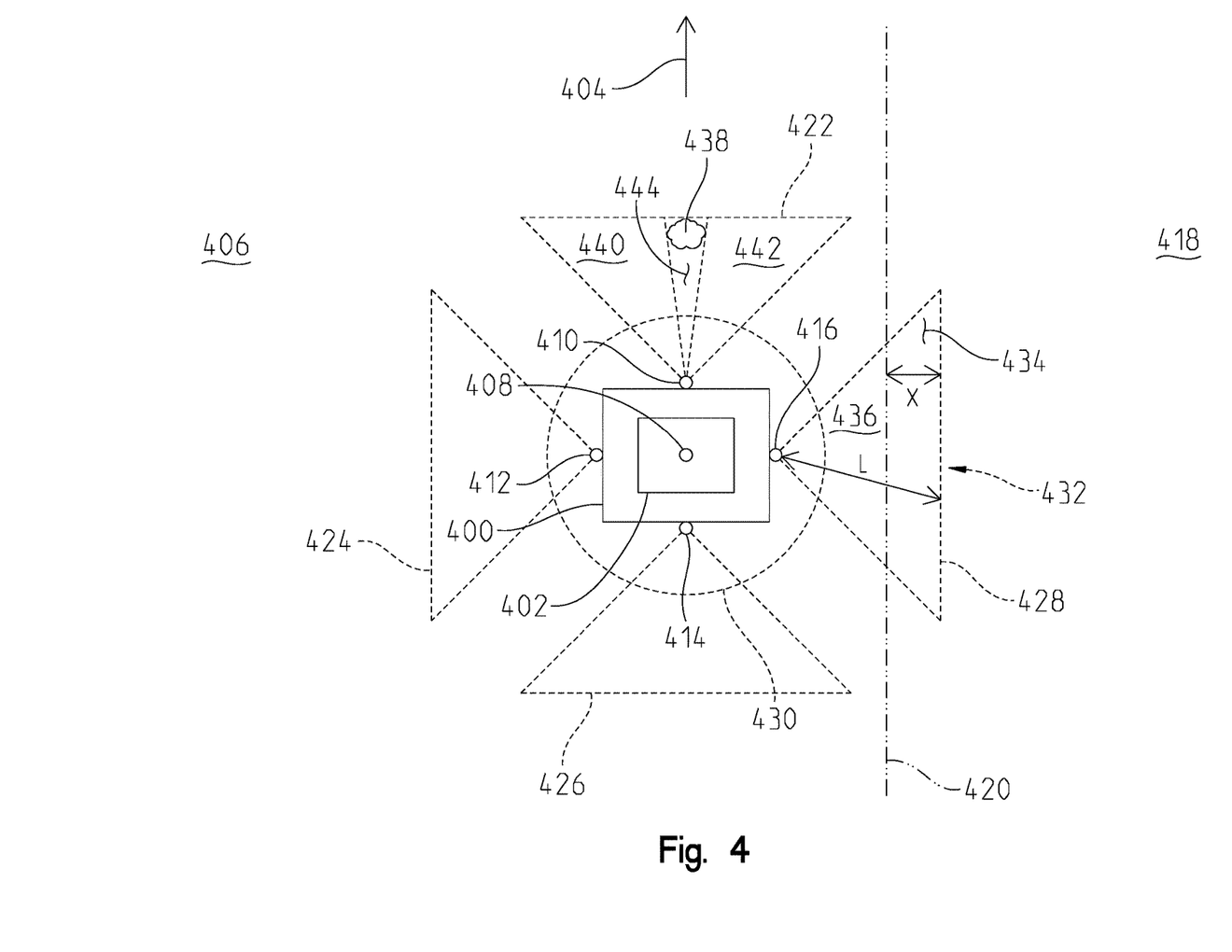
FIG. 4 is a schematic of a work vehicle with a lighting control system.

In a similar embodiment to that of FIG. 3, another embodiment of a work vehicle is shown in FIG. 4. In this embodiment, a work vehicle 400 such as a tractor or combine may be performing an operation in a field 406 as it travels in a forward travel direction 404. The work vehicle 400 may include a cab 402 where an operator is positioned for controlling the vehicle. The cab 402 may include one or more operator or user controls for controlling the operation of the vehicle 400. In this embodiment, the work vehicle 400 is performing a work function or operation in the field 406, which is located adjacent another area designated 418 in FIG. 4. A boundary line such as a property line 420 separates the field 406 from the adjacent area 418. In this embodiment, the work vehicle 400 is only operating in the field 406 and not the adjacent area 418.

The work vehicle 400 may include a lighting system similar to that described in FIGS. 1-3. The lighting system may be a high-definition pixel and/or pixel LED lighting system. The lighting system, for example, may include a plurality of array field lights. In FIG. 4, the plurality of array field lights may include a first array field light 410, a second array field light 412, a third array field light 414, and a fourth array field light 416. Each of the plurality of array field lights may be configured to illuminate different zones or areas around the work vehicle 402.

At least in FIG. 4, the first array field light 410 may be positioned at a front of the work vehicle 400 and project a light emission in a forward direction of travel 404. In doing so, the first array field light 410 may illuminate a first zone 422 in front of the work vehicle 400. The second array field light 412 may be disposed on a first side of the work vehicle 400, and when activated, the second array field light 412 may project a light emission to illuminate a second zone 424 to the first side of the vehicle 400. The third array field light 414 may be positioned on a rear of the work vehicle 400 such that when activated it may project a light emission to illuminate a third zone 426 behind the work vehicle 400. Lastly, the fourth array field light 416 may be positioned on a second side of the work vehicle 400 such that when activated it may project a light emission to illuminate a fourth zone 428 to the second side of the work vehicle 400. Additional array field lights may be disposed on the work vehicle 400 such that as a whole, the lighting system of the work vehicle 400 is able to illuminate the surrounding environment around the work vehicle 400 when activated.

The work vehicle 400 may also include an additional device 408 located on a roof of the cab 402, as shown in FIG. 4. The additional device 408 may be a sensor (e.g., proximity sensor or global-positioning sensor) which is able to detect objects such as an oncoming vehicle, a tree, a fence, a rock, etc. in the field 406. Further, the additional device 408 may include a camera for capturing images or video of the surrounding zones and providing feedback to the controller 222 of the control system 220. In turn, these images or video may be displayed for an operator controlling the work vehicle 400 on a screen or other display in the cab. These images or video may also be transmitted by a transmitting device (not shown) to a remote location. This may be particularly useful if the work vehicle is an autonomous vehicle and is controlled remotely or by control logic. The additional device 408 may include another light such as an array field light or a transmitter. In one instance, the additional device 408 may comprise a strobe light so that the work vehicle 400 is detected by others at remote distances therefrom. The additional device 408 may be a combination of the aforementioned devices (e.g., sensor, camera, light). When activated, the additional device may be able to illuminate a fifth area or zone 430 as shown in FIG. 4. If the additional device is a sensor or camera, it may be able to detect or record images/video in a similar area or zone.

It is noteworthy that the zones depicted in FIG. 4 are illustrative as an example and are not intended to be limiting. As technology continues to evolve, one or more array field lights may be capable of outputting the light emission to illuminate all of the zones in FIG. 4. Thus, the number of array field lights may be different for other embodiments, and the area or zone in which the field light may project may be larger or smaller depending on the embodiment.

In FIG. 4 and as described previously, the work vehicle 400 is operating in the field along a field boundary 420 which separates the field 406 from the adjacent area 418. As the work vehicle 400 travels along the boundary 420, an operator may be alerted to the boundary 420 via a field map input 202. As described above, information from the field map input 202 may include field boundaries, roadways, fence lines, obstacles to avoid, etc. This information may be provided to the controller 222, which can then provide this information to the operator during field operation.

During operation, the field map input 202 may identify the boundary 420 to the controller 222, which in turn may be communicated to the operator. In one example, the adjacent area 418 may be a neighborhood or other area in which an illumination from the lighting system 104 may be a nuisance or otherwise undesirable to those in the adjacent area 418. As a result, the controller 222 may communicate this to the vehicle light control module 224 of the lighting system 104. In this embodiment, the fourth array field light 416 is projecting a light emission to cover the fourth zone 428. The fourth zone 428, however, is shown extending across the boundary 420 and into the adjacent area 418. In particular, the light emission may extend a length L from the fourth array field light 418, and its outer limit is defined by 432 as shown. Moreover, the light projection extends by a partial length X into the adjacent area 418. In this manner, a first portion 434 of the light emission covers an area in the adjacent area 418 and a second portion 436 covers the field 406. The first and second portions are separated or divided by the boundary line 420.

The additional device 408 may be a sensor capable of detecting the overall coverage of the light emission from the fourth array field light 416. Alternatively, a different sensor on the work machine 400 may be capable of detecting this. In any event, a communication may be sent to the controller 222 in regards to the overlapping light emission and adjacent area 418 designated by the first portion 434. In response, the controller 222 may communicate to the light control module 224 to reduce the projection of the light emission from the fourth array field light 416 so that only the second portion 436 of the fourth zone 428 is illuminated. In other words, the light control module 224 may operably control the output of the fourth array field light 416 so that its light emission does not extend beyond the boundary line 420. To do so, the light control module 224 may disable one or more pixels or pixel segments of the fourth array field light 416.

This may be similar to the embodiment of FIG. 3 where the light emission from the field light 318 may be operably controlled to reduce or eliminate the illumination into the far field, FF. As such, only the near field NF is illuminated by the field light 318. This same result may apply in FIG. 4 where the output of the fourth array field light 416 is controlled to reduce its intensity and reach into the field 406 so as to not illuminate areas outside the field 406. Thus, identifying the field boundary 420 and detecting if the light emission extends beyond the boundary may be steps taken to reduce nuisance lighting in areas outside of a field being worked by the work vehicle 400.

As also shown in the embodiment of FIG. 4, an object 438 such as a rock, tree, telephone pole, cell phone tower, or other obstacle may be located in the field 406. This object may be predefined in a field map such that is it communicated via the field map input 202 to the controller 222. Alternatively, the object 438 may be detected by a sensor or camera such as, for example, the device 408 on the cab. In any event, the detection and location thereof may be communicated to the controller 222, which in turn may alert the operator of the work vehicle 400. This may be done via a display screen, heads up display (HUD), or other method in the cab 402.

It may also, however, be identified to the operator by using the lighting system 104 on the vehicle 400. As shown in FIG. 4, the first array field light 410 projects a light emission to cover the first zone 422 in which the object 438 is present. Upon detecting the object 438, the controller 222 may communicate with the light control module 224 to adjust the output of the first array field light 410 such that the light emission is divided into three different portions—i.e., a first portion 440, a second portion 442, and a third portion 444. The object 438 is located in the third portion 438 of the light emission in this example. The light control module 438 may operably control the first array field light 416 such that the pixels or pixel segments that illuminate the third portion 444 of the light emission may be brighter or more intense to clearly highlight the object 438 to the operator. Alternatively, the third portion 444 of the light emission may be reduced while the first and second portions are either not adjusted or the light intensity is increased.

In one example, the light control module 224 may operably control the light emission projected from the first array field light 410 such that the first and second portions are unchanged and the third portion 444 is adjusted. In another example, the first and second portions of the light emission may be adjusted while the third portion 444 remains unchanged. In a further example, the intensity of the first and second portions of the light emission may be reduced while the intensity of the third portion of the light emission may be increased. In yet a further example, the intensity of the first and second portions of the light emission may be increased while the intensity of the third portion of the light emission may be reduced. In yet another example, the light control module 224 may be able to adjust the color of the light emission being projected from each pixel or pixel segment to further identify objects or boundaries to the operator. This may also include using a continuous light emission, a flickering light emission or pulsing the light emission. In any event, the light control module 224 may operably control the intensity, color and/or pattern of the different portions of the light emission being projected from the first array field light 410 to visually identify the object 438 to the operator.

In the aforementioned examples and embodiments of the present disclosure, the controller 222 is able to communicate with the light control module 224 to independently adjust the output from each of the plurality of array field lights of the work vehicle 400. The adjustment may include activating or de-activating each individual field light for the sake of identifying objects, boundaries and the like in the field or areas outside the field for the benefit of the operator of the vehicle. It may also disable or de-activate individual pixels or pixel segments of each field light in order to avoid or limit nuisance light in areas outside the field, including roadways where oncoming traffic may be affected by the intensity of the individual lights.

In addition, beyond simply identifying an object or boundary in the field, the controller 222 may include logic to execute additional functions. This may include, for example, maneuvering the work vehicle 400 so it avoids the object (e.g., if the vehicle is an autonomous vehicle). Further, the controller 222 may controllably raise or lower an implement (e.g., a spray boom) to avoid a rock or tree branch, for example. Moreover, the controller 222 may adjust a head (e.g., a draper head) mounted to the work vehicle to avoid the object. Other functions may be executed by the controller 222 automatically via control logic or via a command from the operator.

In another example, the light control module 224 may adjust the light intensity such as dimming the individual lights or increasing the luminosity, particularly if using white lights or using the white color spectrum.

In this disclosure, LED technology is covered but is not intended to be limiting. Other lighting technologies may be used as well including laser, DLP, a combination of LED and other, etc. Each light may be an array field light or light source.

In this disclosure, a plurality of sensing device technologies are described including proximity sensors and camera-based technology. Other sensing technologies such as LIDAR, infrared, radar, etc. may also be used.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural work vehicle for operating in a field, comprising:
   a chassis;
   a cab mounted to the chassis;
   a controller for controlling operation of the work vehicle, the controller being in communication with a field map input;
   a lighting system of the work vehicle comprising a array field light, the array field light configured to project a light emission to illuminate a zone;
   a light control module disposed in electrical communication with the controller, the light control module configured to operably control the array field light;
   wherein, upon identifying an object in the field based on the field map input, the controller determines if the object is in the zone;
   further wherein, if the object is in the zone, the light control module controllably adjusts an output from the array field light based on a location of the object in the zone;
   wherein:
   the light emission from the array field light corresponds to a first portion and a second portion, the location of the object being in the first portion;
   the light control module controllably adjusts the output of the array field light so that the first portion of the light emission is different from the second portion.

2. The work vehicle of claim 1, wherein the light control module operably adjusts an intensity of the first portion of the light emission.

3. The work vehicle of claim 1, wherein the light control module operably adjusts an intensity of the second portion of the light emission.

4. The work vehicle of claim 1, wherein the light control module operably adjusts a pattern of the first portion of the light emission.

5. The work vehicle of claim 1, wherein the light control module operably adjusts a color of the first portion or second portion of the light emission.

6. The work vehicle of claim 1, wherein the light control module operably adjusts the first portion or the second portion to repeatedly flicker between an on state and an off state.

7. An agricultural work vehicle for operating in a field, comprising:
   a chassis;
   a cab mounted to the chassis;
   a controller for controlling operation of the work vehicle, the controller being in communication with a field map input;
   a lighting system of the work vehicle comprising a array field light, the array field light configured to project a light emission to illuminate a zone;
   a light control module disposed in electrical communication with the controller, the light control module configured to operably control the array field light;
   wherein, upon identifying an object in the field based on the field map input, the controller determines if the object is in the zone;
   further wherein, if the object is in the zone, the light control module controllably adjusts an output from the array field light based on a location of the object in the zone;
   wherein the output of the array field light is operably controlled by the light control module such that an outer limit of the light emission is reduced.

8. The work vehicle of claim 7, wherein after the light emission from the array field light is reduced, the light emission does not illuminate the object.

9. The work vehicle of claim 7, wherein, once the light emission is reduced, only a portion of the zone in which the object is not located is illuminated.

10. An agricultural work vehicle for operating in a field, comprising:
    a chassis;
    a cab mounted to the chassis;
    a controller for controlling operation of the work vehicle, the controller being in communication with a field map input;
    a lighting system of the work vehicle comprising a array field light, the array field light configured to project a light emission to illuminate a zone;
    a light control module disposed in electrical communication with the controller, the light control module configured to operably control the array field light;
    wherein, upon identifying an object in the field based on the field map input, the controller determines if the object is in the zone;
    further wherein, if the object is in the zone, the light control module controllably adjusts an output from the array field light based on a location of the object in the zone;
    wherein the array field light comprises a high-definition pixel LED lighting module; and
    wherein the light control module operably enables or disables one or more pixel segments of the array field light based on a location of the object in the zone.

11. An agricultural work vehicle for operating in a field, comprising:
    a chassis;
    a cab mounted to the chassis;
    a controller for controlling operation of the work vehicle, the controller being in communication with a field map input;

a lighting system of the work vehicle comprising a array field light, the array field light configured to project a light emission to illuminate a zone;
a light control module disposed in electrical communication with the controller, the light control module configured to operably control the array field light;
wherein, upon identifying an object in the field based on the field map input, the controller determines if the object is in the zone;
further wherein, if the object is in the zone, the light control module controllably adjusts an output from the array field light based on a location of the object in the zone;
further comprising an implement operably coupled to the work vehicle;
wherein, the controller operably controls a position or movement of the implement based on a location of the object in the zone.

12. A control system of an agricultural work vehicle configured to work in a field, comprising:
a controller for controlling the work vehicle;
a light control module for controlling a lighting system of the work vehicle, the lighting system including at least a first array field light and a second array field light; and
a sensing device comprising a camera or sensor for detecting a presence of an object in the field, the sensing device being in electrical communication with the controller;
wherein, the first array field light is operably controllable to project a light emission to illuminate a first zone in the area and the second array field light is operably controllable to project a light emission to illuminate a second zone in the area, the first zone and second zone being different from one another;
wherein, upon detecting the object in the area, the sensing device transmits a signal indicative of the object to the controller;
wherein, the controller determines if the detected object is in the first zone or the second zone;
further wherein,
if the object is in the first zone, the light control module controllably adjusts an output from the first array field light based on a location of the object in the first zone; and
if the object is in the second zone, the light control module controllably adjusts an output from the second array field light based on a location of the object in the second zone.

13. The control system of claim 12, wherein:
if the object is in the first zone, the light control module controllably adjusts an intensity of the light emission from the first array field light; and
if the object is in the second zone, the light control module controllably adjusts an intensity of the light emission from the second array field light.

14. The control system of claim 12, wherein:
if the object is in the first zone, the light control module controllably adjusts a color of the light emission from the first array field light; and
if the object is in the second zone, the light control module controllably adjusts a color of the light emission from the second array field light.

15. The control system of claim 12, wherein:
if the object is in the first zone, the output of the first array field light is operably controlled by the light control module such that an outer limit of its light emission is reduced; and
if the object is in the second zone, the output of the second array field light is operably controlled by the light control module such that an outer limit of its light emission is reduced.

16. The control system of claim 15, wherein after the outer limit of the light emission from either the first or second array field light is reduced, the respective array field light does not illuminate the object.

17. A control system of an off-road work vehicle configured to work in a field, comprising:
a controller for controlling the work vehicle;
a light control module for controlling a lighting system of the work vehicle, the lighting system including a array field light; and
a field map input in communication with the controller, the field map input configured to communicate a boundary line of the field to the controller;
wherein, the array field light is operably controllable to project a light emission to illuminate a zone in the field;
wherein, upon receiving the boundary line from the field map input, the controller determines if the zone overlaps the boundary line;
further wherein, if a portion of the zone overlaps the boundary line, the light control module controllably adjusts an output from the array field light to disable the light emission from illuminating the portion of the zone.

18. The control system of claim 17, wherein:
the controller determines a second portion of the zone is in the field and does not overlap the boundary line;
the light control module operably controls the output of the array field light such that the second portion of the zone is illuminated.

* * * * *